(12) United States Patent
Singh

(10) Patent No.: US 11,084,708 B2
(45) Date of Patent: Aug. 10, 2021

(54) COMPACT APPARATUS FOR FERMENTATION AND PRESSING OF WINE

(71) Applicant: Vijay Singh, Far Hills, NJ (US)

(72) Inventor: Vijay Singh, Far Hills, NJ (US)

( * ) Notice: Subject to any disclaimer, the term of this patent is extended or adjusted under 35 U.S.C. 154(b) by 587 days.

(21) Appl. No.: 15/875,023

(22) Filed: Jan. 19, 2018

(65) Prior Publication Data

US 2019/0225480 A1  Jul. 25, 2019

(51) Int. Cl.
*B67D 7/02* (2010.01)
*C12G 1/036* (2006.01)
*B01F 11/00* (2006.01)
*C12G 1/00* (2019.01)
*B67D 7/76* (2010.01)

(52) U.S. Cl.
CPC ........ *B67D 7/0261* (2013.01); *B01F 11/0045* (2013.01); *B67D 7/76* (2013.01); *C12G 1/005* (2013.01); *C12G 1/0206* (2013.01); *B01F 2215/007* (2013.01)

(58) Field of Classification Search
CPC ...... B67D 7/0261; B67D 7/76; B67D 7/0244; B67D 5/01; B67D 5/02; B01F 11/0045; B01F 2215/007; B30B 9/22
USPC .......... 99/276, 277, 467, 472, 473; 426/283, 426/412, 451, 458, 484, 497, 549, 634
See application file for complete search history.

(56) References Cited

U.S. PATENT DOCUMENTS

| | | | |
|---|---|---|---|
| 7,377,686 B2 | 5/2008 | Hubbard | |
| 2003/0194302 A1 | 10/2003 | Hickinbotham | |
| 2010/0025867 A1* | 2/2010 | Benton | B01F 3/0473 261/110 |
| 2015/0147433 A1* | 5/2015 | Singh | B30B 9/22 426/15 |
| 2018/0273272 A1* | 9/2018 | Liao | B65D 81/03 |

* cited by examiner

*Primary Examiner* — Phuong T Nguyen
(74) *Attorney, Agent, or Firm* — Barnes & Thornburg LLP

(57) ABSTRACT

An apparatus for the production of red wine is provided. This compact device is suitable for home and hobby use. The fermenting wine is contained inside a single-use plastic bag, eliminating cleaning. A reusable rubber bladder is inflated periodically to squeeze the cap and disperse it. At the conclusion of the fermentation, a perforated device is inserted into the fermentation bag and pneumatic bladders are sequentially inflated to press out the wine while retaining the waste skins and seeds.

6 Claims, 10 Drawing Sheets

STEP 2

COMPACT APPARATUS FOR FERMENTATION AND PRESSING OF WINE

FIELD

The presently disclosed embodiments relate generally to agitation devices and methods for the making of wine.

BACKGROUND

In the fermentation of red wine, carbon dioxide gas is generated, and this causes the grape skins present in the fermentation to float up to the top of the liquid in the fermenter and form what is termed a "cap." During fermentation, this cap must be periodically broken up so that the skins are mixed into the liquid in order to most effectively extract color and flavor compounds from the skins and seeds. The cap must also be kept moist to prevent the growth of deleterious aerobic bacteria.

SUMMARY

Disclosed embodiments provide a compact, inexpensive, automated device for the fermentation of red wine that can be fitted onto a 20 to 50 gallon pail so as to eliminate the need for tedious hand "punching" and also improve quality by ensuring consistent cap management.

In accordance with at least one disclosed embodiment, the cap is squeezed by a pneumatic bladder which is effective at both breaking up and wetting the cap without manual intervention.

In accordance with at least one embodiment, a device is provided for installation in a cylindrical pail or cubic bin ranging in volume from 10 to 50 gallons and consists of single-use plastic bag in which the fermenting wine is contained, and a series of rubber bladders that can be inflated by an external source of air.

In accordance with at least one embodiment, the device can be used for pressing out the finished wine by inserting a hollow perforated tube into the fermenting bag and then inflating the rubber bladders in sequence to squeeze out the clear wine while retaining the waste seeds and depleted grape skins.

In a disclosed embodiment of a method of operation, the fermenting wine is contained inside a flexible plastic bag. The bag is placed inside a cylindrical rubber sleeve, which is turn is contained inside a rigid pail. The rubber sleeve is inflated periodically. As it expands it squeezes the fermenting wine, compressing the cap of seeds and skins that forms on the top, and also forces the wine up through the cap. As pressure is released, the cap disperses. This sequence also wets the cap thoroughly, operations that are essential to the production of quality wine.

In accordance with at least one embodiment, the device can be used for the pressing and fermentation of white wine. In this variation, the grapes are pressed in the disclosed embodiment and pressed juice collected in a fermentation vessel where the fermentation to wine is performed in the absence of skins and seeds.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 4A:
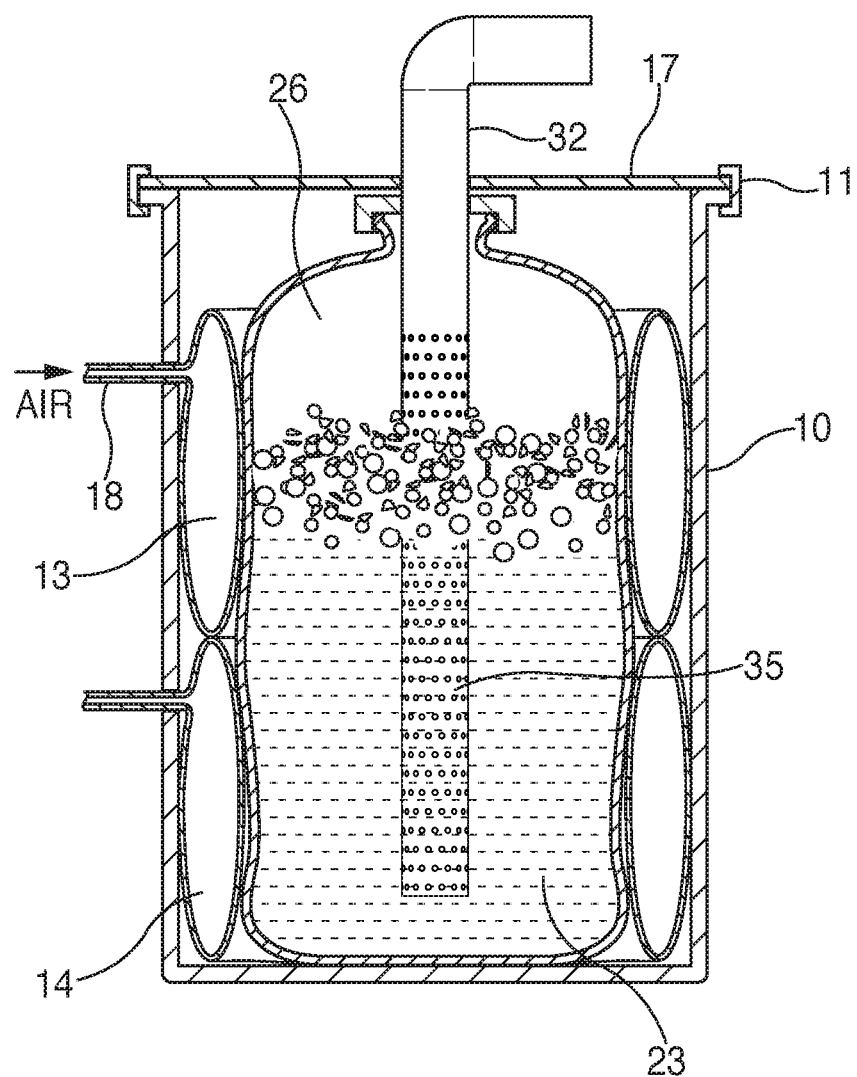
FIG. 4A is a side sectional view of the device in a first step of a PRESSING operation, with the pressing tube inserted into the fermentation bag and the lid is securely attached to the containment pail in accordance with a disclosed embodiment.
Figure 4B:
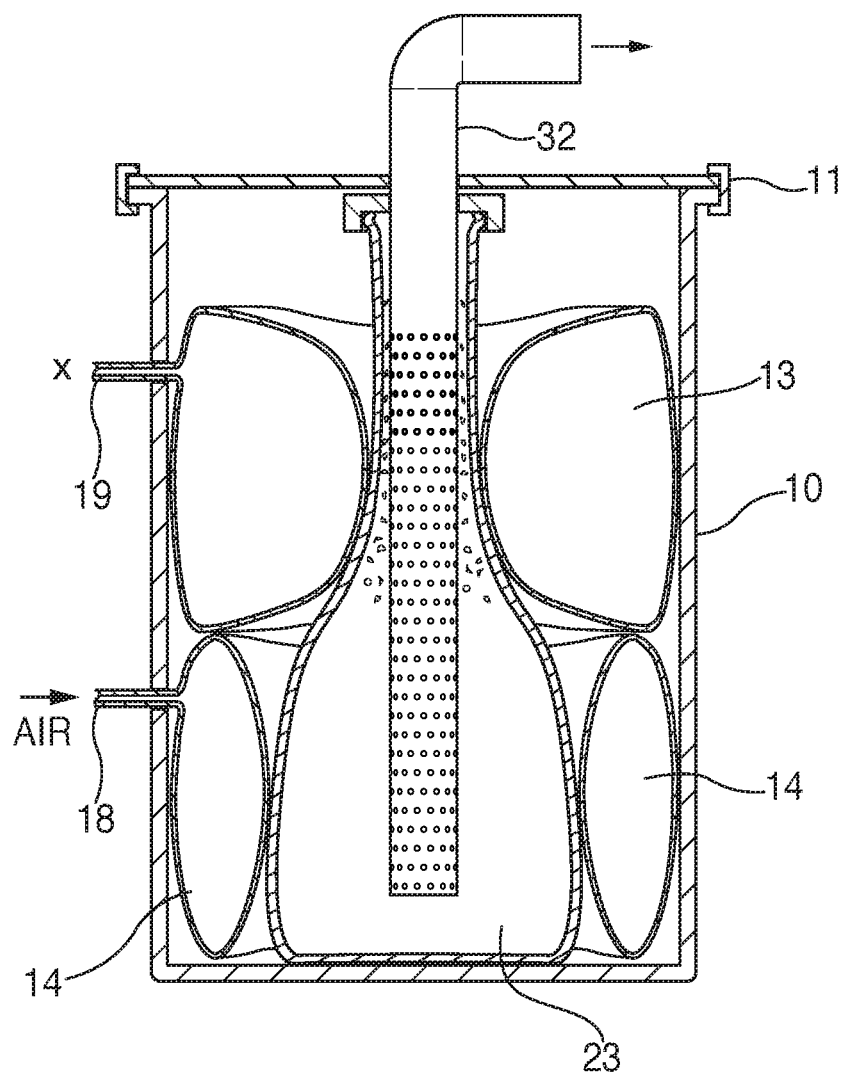
FIG. 4B is a side sectional view of the device illustrating a second step of the PRESSING operation following the insertion of FIG. 4A, during which inflation of the upper bladder forces the headspace gas out of the fermentation bag.
Figure 4C:
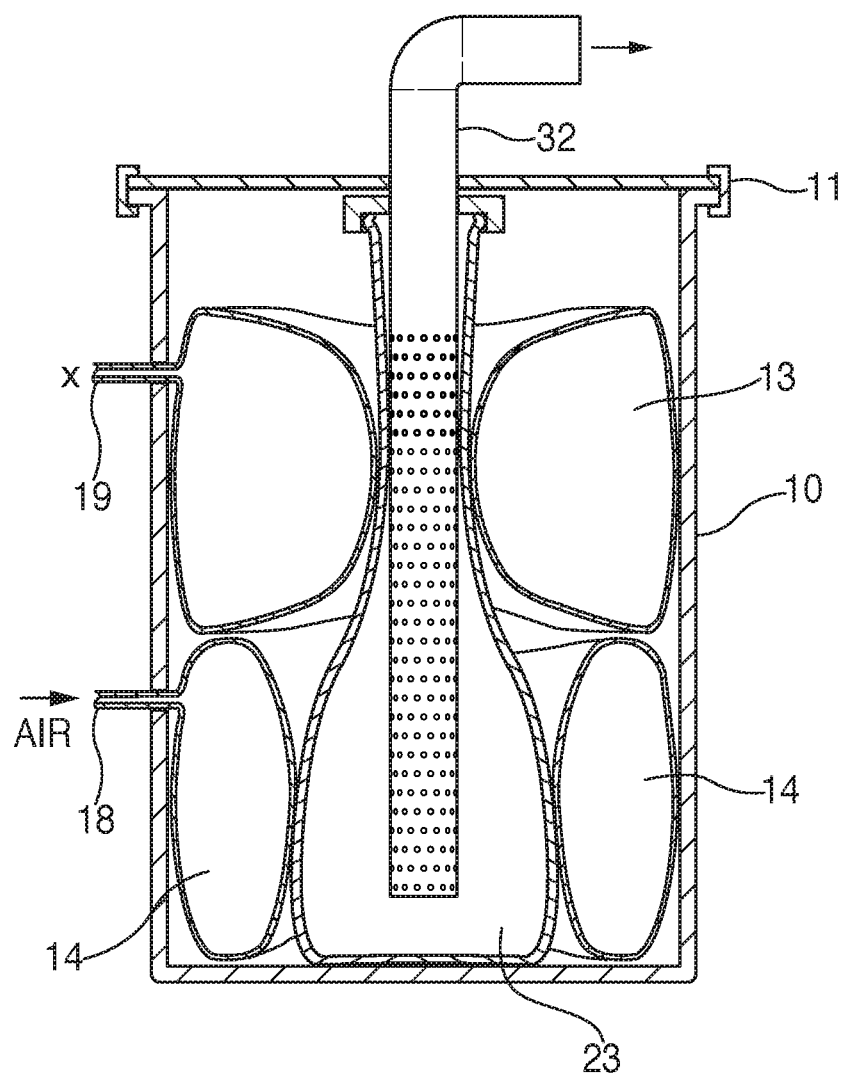
FIG. 4C is a side sectional view of the device illustrating a third step of the PRESSING operation following the inflation of FIG. 4B, during which the upper bladder remains inflated and the bottom bladder is inflated forcing clean wine out of the fermentation bag through the perforated pressing tube to a collection vessel for further processing in accordance with a disclosed embodiment.
Figure 4D:
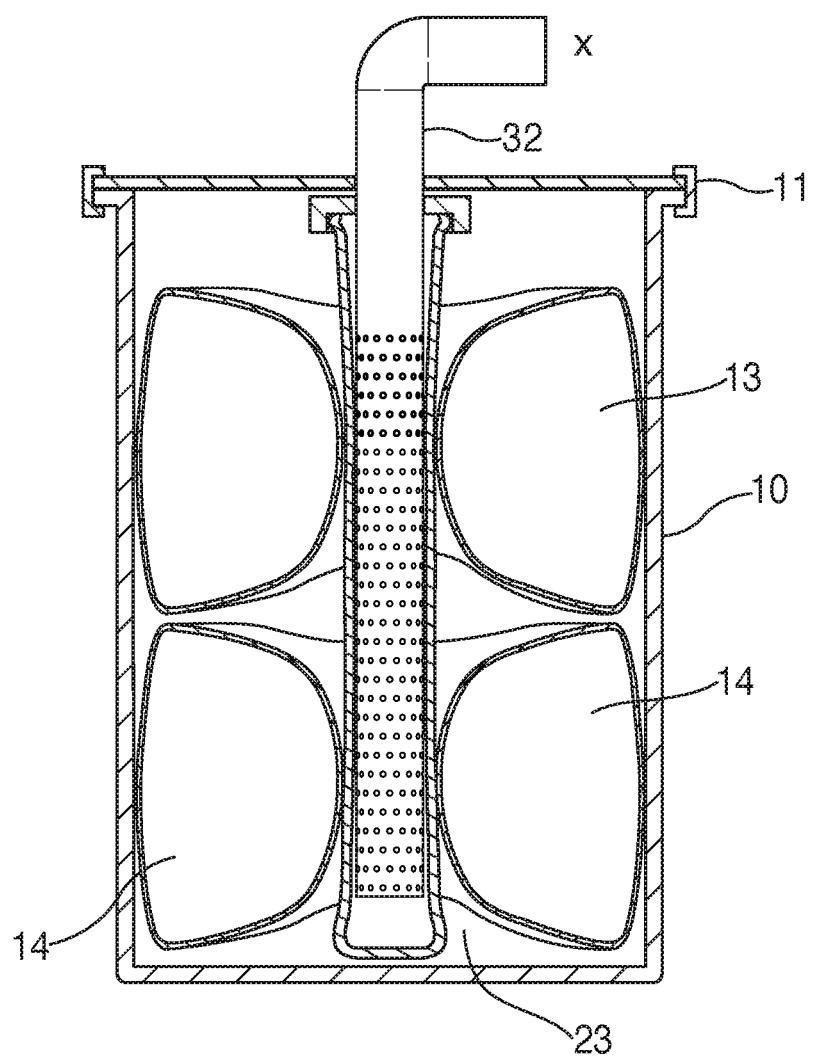
FIG. 4D is a side sectional view of the device illustrating a fourth step of the PRESSING operation following the inflation of FIG. 4C, during which both bladders are fully inflated during which time wine stops flowing out of the device.
Figure 4E:
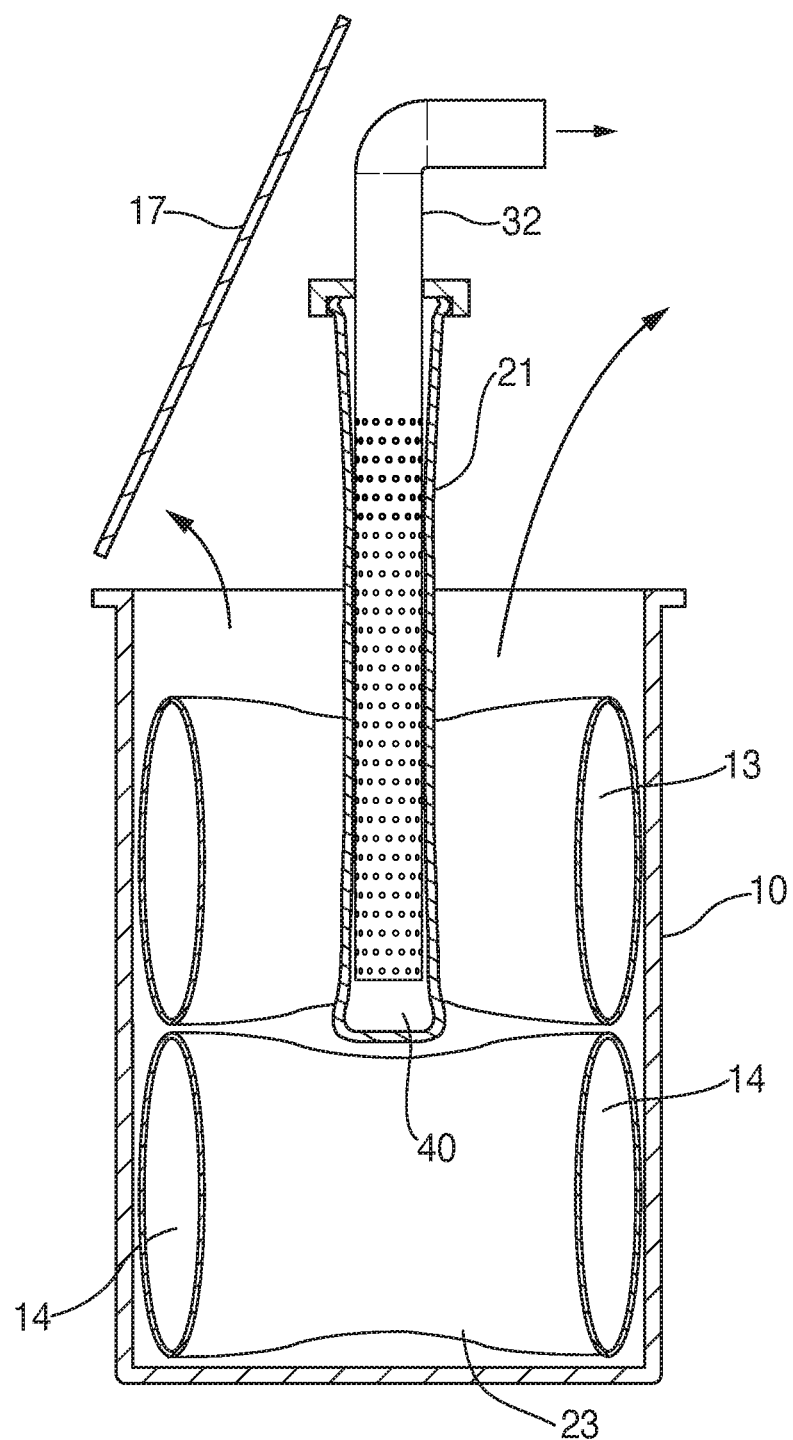
Figure 5:
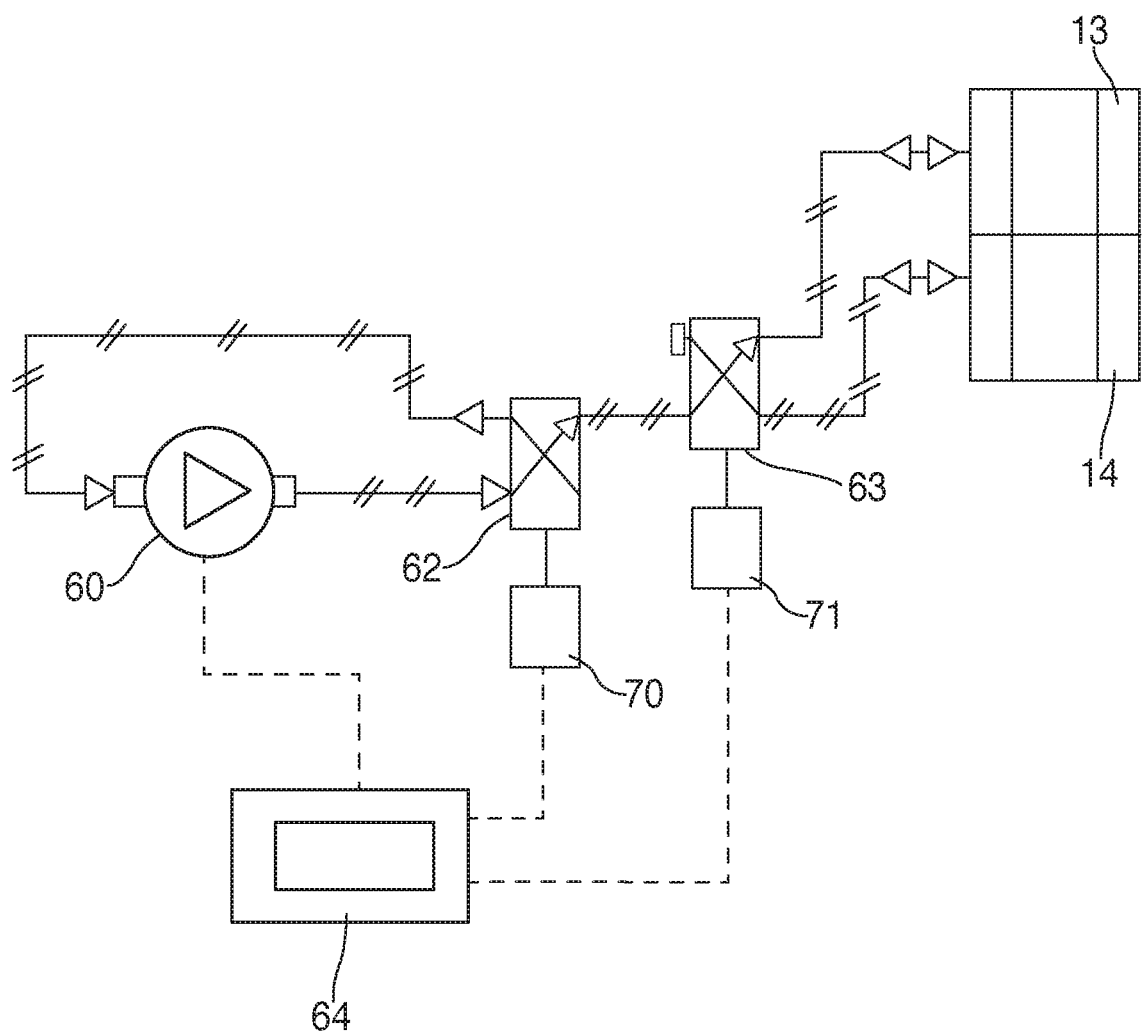

FIG. 4E is a side sectional view of the device illustrating the fifth step of the PRESSING operation following the termination of wine flow of FIG. 4D, during which both bladders are deflated and the lid removed to facilitate removal and disposal of the fermentation bag containing the spent pomace in accordance with a disclosed embodiment and FIG. 5 is a schematic of a system including the device and a control system used to actuate the inflation bladder for punching and pressing.

DETAILED DESCRIPTION

Conventionally, the agitation of the cap has been performed by poking the cap with a pole to break it up. This tedious process is termed "punch down" and must be performed several times a day. Conventional punchdown techniques require an open top fermentation vessel. These open top fermenters permit air to contact the fermenting wine causing unwanted oxidation.

Although automated punchdown devices are commercially available, such devices are both mechanically complex, and require a moving seal to prevent contaminating the fermenting wine. Alternatively, other conventional methods for performing automated punchdown include pumping the liquid taken from the bottom of the fermenter over the cap to moisten it; however, although this conventional technique is widely used, it is ineffective in breaking up the cap.

Other techniques for "cap management" include using horizontally rotating fermenters (Rieger, U.S. Pat. No.

4,474,890 and Speidel, EP 0337060) that force the cap into the liquid. Such devices, however, are expensive and complex machines with large rotating assemblies, making them impractical for most wineries. Klein et. al. (U.S. Pat. No. 6,703,055) describes a fermentation tank with rotating mechanical agitators to flood the cap when needed.

The technique described by Singh (U.S. Pat. Nos. 9,260,452 and 9,611,452) is more useful and utilizes plastic bags and an inflation process for "cap management" as part of commercial wine processing.

However, no conventional technology provides an inexpensive device that can be used for hobby scale operation of 10 to 30 gallons (30 to 120 liters). Further, conventional technologies fail to provide a simple and inexpensive mechanism for pressing out the finished wine. Disclosed embodiments address these deficiencies.

Figure 1:
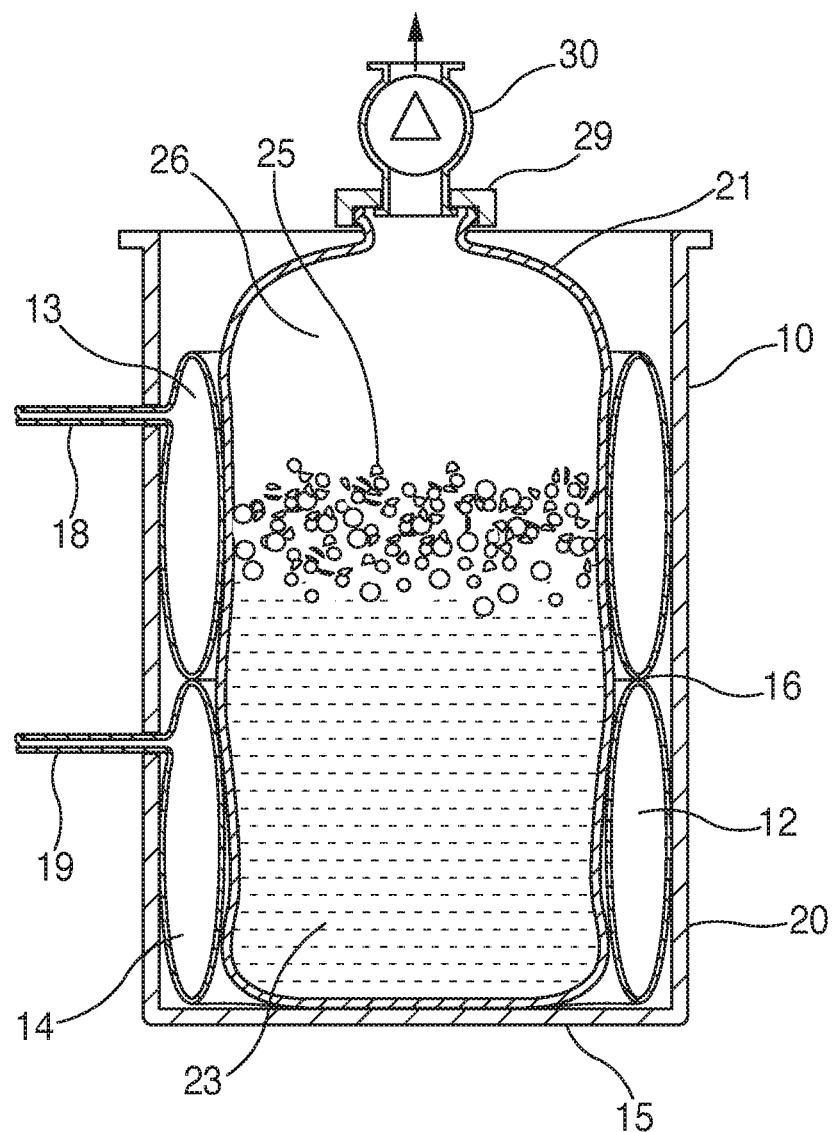
FIG. 1 is a side sectional view illustrating a device with the fermentation bag located inside a bladder annulus having a plurality of bladders in deflated positions, in accordance with a disclosed embodiment.

Referring now to the drawings, wherein like reference numerals and characters represent like or corresponding parts and steps throughout each of the views, there is shown in FIG. 1 a side sectional view of a wine fermentation vessel illustrating a filled fermentation bag placed inside the annulus of a cylindrical pressurization bladder.

In this particular embodiment, a rigid outer container 10 supports a fermentation bag 21 placed inside an inflation bladder 12. In this embodiment, the outer container is a 30 gallon plastic drum having a sidewall 20 and bottom 15. The inflation bladder 12 consists of two chambers located axially one above the other and separated by a seam 16 formed continuously around along an axis of separation of the inflation bladder 12. The upper chamber 13 can be inflated and deflated independently of lower chamber 14 through inflation tube 18.

The lower chamber 14 can be inflated and deflated independently of the upper chamber 13 by use of inflation tube 19. FIG. 1 shows both the chambers deflated. The fermentation bag 21 may be partially (e.g., up to 60%) full of the fermenting must 23. The headspace 26 in the fermentation bag inflates to tautness due to the carbon dioxide gas generated by the fermenting must. A spring actuated relief valve 30 is attached to the top port of the fermentation bag and this relief valve vents excess gas to the atmosphere to prevent overpressure in the fermentation bag (0.1 to 0.5 psig). During fermentation, the skins and seeds float to the top of the liquid 23 and form a cap 25.

Figure 2:
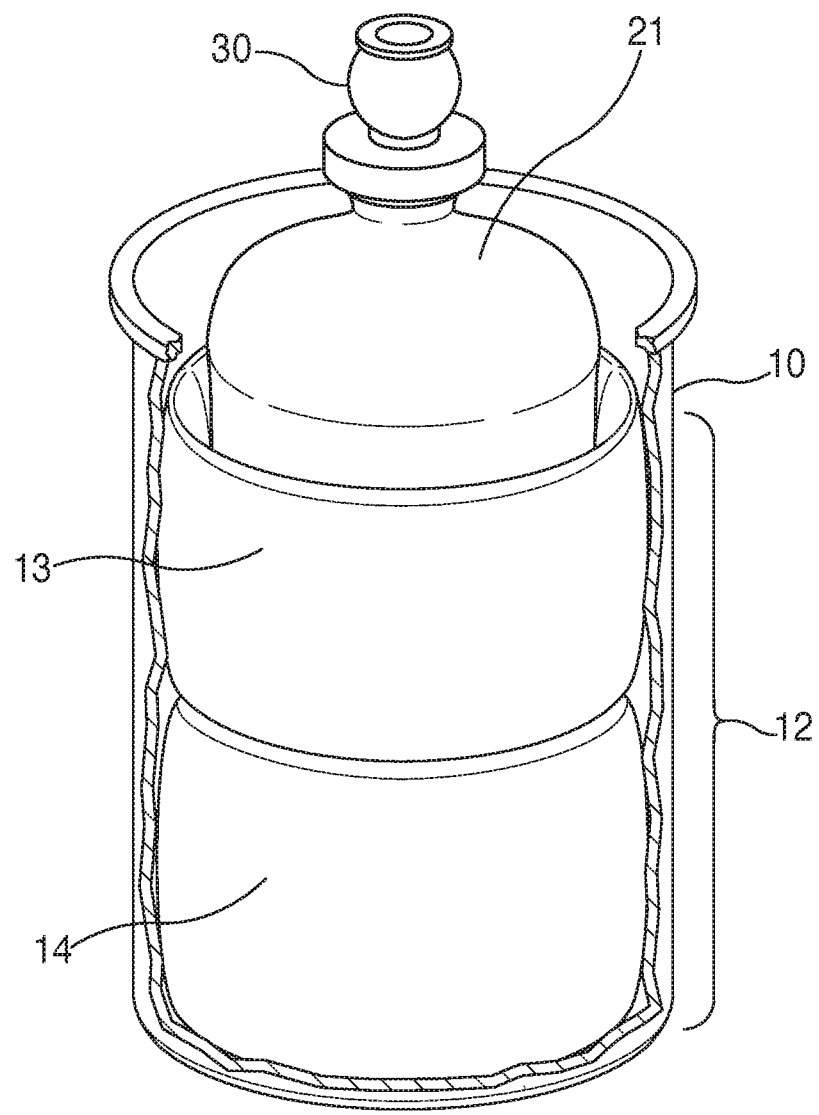
FIG. 2 is a perspective view illustrating a cylindrical rubber bladder, containment pail, and fermentation bag in accordance with the disclosed embodiment of FIG. 1.

For purposes of illustration, a perspective view of the apparatus is shown in FIG. 2. As can be seen, the inflation bladder 12, completely surrounds fermentation bag 21 and lies between fermentation bag and rigid outer container wall 20. Inflation bladder 12 may be ring-shaped so as to completely surround fermentation bag 21. However, inflation bladder 12, may also be rectangular shaped so as to completely surround fermentation bag 21, depending on the geometry of the rigid outer container 10.

Figure 3A:
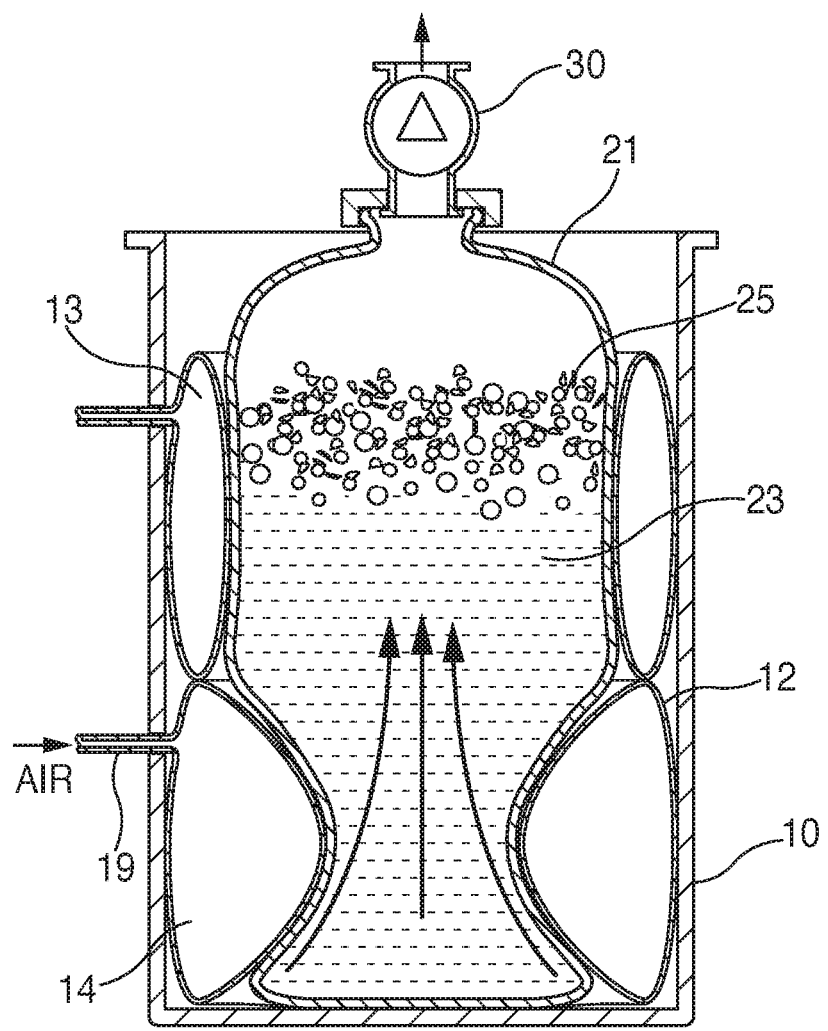
FIG. 3A is a side sectional view of the device illustrating the device dispersing the cap by inflating the bottom bladder chamber during an inflation cycle in accordance with the disclosed embodiment.

A means to periodically agitate the must 23 and break up the cap 25 is illustrated in reference to FIG. 3A, which shows a side sectional view of the configuration in which the lower chamber 14 of bladder 12 is pressurized by introducing compressed air through inflation tube 19. The introduction of the compressed air causes the lower chamber 14 to expand forcing the wine must 23 in the lower part of fermentation bag 21 to be pushed up through the cap 25. The cap is also squeezed the expansion of the lower chamber. Excess gas in the headspace 26 is pushed out through the relief valve 30.

Figure 3B:
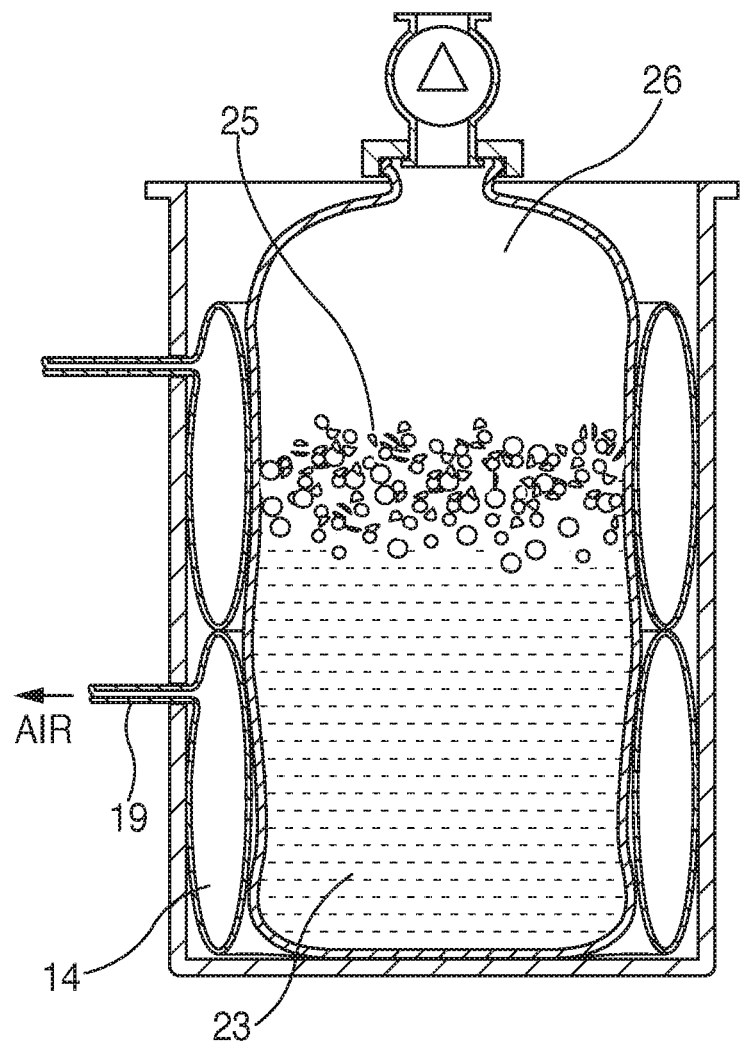
FIG. 3B is a side sectional view of the device illustrating the device after the inflation cycle in FIG. 3A, during which the bottom bladder is deflated and the cap wetted and dispersed.

The device may be maintained in this pressurized configuration for a few minutes. After a few minutes, air in the lower bladder 14 is pumped out through tube 19 by reversing the action of the inflation pump. This causes the lower chamber of the bladder to deflate and results in the configuration shown in FIG. 3B. The cap 25 is dispersed by the inflation/deflation cycle and thoroughly wetted by the liquid, or must 23. This is essential to the extraction of color and flavor from the skins. This operation to agitate and breakup the cap is termed a punch. It should be noted that the entire punch cycle is performed without any exposure to air due to the relief valve 30. In wine fermentation, it is critical that air contact be avoided to prevent oxidation. During the inflation phase, the carbon dioxide in the headspace 26 is forced out through the relief valve 30. During the deflation phase, this valve acts as a check valve and prevents air being sucked into the fermentation bag as the lower bladder chamber deflates. At the end of the each deflation phase, there will be essentially no gas in the headspace but as the fermentation proceeds, carbon dioxide is generated by the fermenting yeast and the headspace 26 will fill up again with carbon dioxide and become taut. This generated carbon dioxide may be either expelled through the relief value 30 to relieve overpressure or forced out in the next punch cycle.

At the conclusion of the fermentation, it is necessary to press out the fermented wine separating it from the spent grape skins, seeds, stems, and yeast debris (i.e., pomace). FIG. 4A shows how this may be done in the present embodiment. First, the relief valve 30 is removed from the mating port on the fermentation bag and a perforated tube 32 may be inserted in its place and securely attached to the mating port which may consist of a threaded fitting or clamp. The perforated tube must seal onto the bag in a airtight fashion Perforated tube 32 may include perforations 35 extending along an entire portion of the tube that extends into the fermentation bag 21 so that some of the perforations may be positioned in the headspace 26 and some may be positioned in the wine 23. Next, a top or lid 17 may be fitted onto the rigid outer container 10 and locked into position using clamp 11. The outlet 33 of perforated tube 32 may be connected to a wine collection vessel 44 using a hose (not shown). Then, the upper chamber 13 of the inflation bladder 12 may be pressurized using compressed air introduced through inflation tube 18. This causes the upper chamber 13 to expand forcing any gas in the headspace 26 out through the perforated tube 32.

FIG. 4B shows a configuration of the device when the upper chamber 13 is fully inflated. Once this is achieved, the lower chamber 14 may be inflated using compressed air introduced through inflation tube 19. During inflation of the lower chamber 14, the upper chamber 13 may be maintained in a fully inflated position. The expansion of the lower chamber 14 forces the wine 23 through the perforated tube 32 and into the wine collection vessel 44. The perforations 35 in the tube 32 are sized such that skins, seeds, and stems are retained in the fermentation bag. This clean wine may be pressed out of the fermentation bag 21 by action of the pneumatic bladder 12. FIG. 4C shows the configuration when the lower chamber 14 is partially inflated and the clean wine has been partially forced out.

FIG. 4D shows a configuration where both chambers 13, 14 of the inflation bladder 12 are fully inflated. The full inflation of both bladders forces all the clean wine out of the fermentation bag 21 into the wine collection vessel.

Next, both chambers of the inflation bladder 12 may be deflated by pumping out the air used for inflation. This results of deflation are shown in FIG. 4E. With the chambers deflated completely, the lid 17 may be removed and the fermentation bag 21 containing the waste pomace (skin and seeds) 40 may be lifted out of the inflation bladder 12 and rigid outer container 10. The perforated tube 32 may then be removed and washed for the next use. The fermentation bag 21 containing the waste may simply be discarded. This operation eliminates the messy cleaning of the pomace sludge and a new fermentation can be started immediately with a new fermentation bag 21. The use of a new bag 21 for each run ensures a clean fermentation vessel. Improperly cleaned fermentation equipment is a major reason for poor quality homemade wine. This source of contamination is entirely eliminated in the described embodiment.

A simple control system embodiment is shown in FIG. 5. This embodiment uses a small air compressor 60, and two valves 62, 63 to automate the punch and press cycles. A 2-way 4-port directional valve 62 is used to reverse airflow from the compressor 60 by actuating solenoid 70. This enables the single air compressor to either inflate or deflate a bladder chamber 13, 14. A second 2-way 4-port directional valve 63 determines whether the air is directed to and from the upper bladder chamber 13 or the lower chamber 14. This valve may be actuated by solenoid 71. A controller such as a microprocessor 64 controls the solenoids and runs the required sequence and timing. The control system may be configured to run a punch or press sequence by a simple push of a button. The punch cycle can also be automated to run at a user-specified interval. This enables unattended punch operations.

In the present embodiment, fermentation bag 21 is provided with a large diameter port 29. The 8 inch diameter large opening allows the introduction of either crushed, whole grapes, or whole grape clusters. This greatly increases the usefulness of the apparatus for home and hobby use as grape crushing and destemming equipment may not be readily available and the winemaker may have to use whole grape clusters. Oak pieces can also be introduced through this large opening for flavor modification.

While the present embodiment relates mainly to the fermentation and pressing of red wine it can be effectively also be used for white wine production. White wine is fermented in the absence of skins and seeds which would otherwise impart color and tannins to the wine. White wine making begins with the pressing of grapes to extract the juice. This is a tedious and messy step and requires an expensive grape press. It must be done carefully so as not to crush the seeds which would result in bitterness. The present embodiment can be easily adapted to produce white wine. First, an empty fermentation bag is set up with the cylindrical inflation bladder inside the rigid outer container as described earlier for red wine production. The bag is then filled with grapes. Now, instead of starting the fermentation, the perforated pressing tube is inserted into the bag and the lid attached to the rigid outer container. The outlet of the perforated tube is connected to the intended fermentation vessel (could be a bag or a tank). The pressing operation is then initiated by sequentially inflating the bladder chambers as described earlier. This forces the clean grape juice out of the bag into the fermentation vessel. The unneeded skins and seeds are retained but the perforated tube and left behind in the bag. After all the juice has been recovered, the device is depressurized and the bag containing the spent skins and seeds discarded. The fermentation of the grape juice to wine is then continued by adding yeast to the clean collected grape juice. This pressing operation is very gentle and ensures that seeds are not crushed.

The invention claimed is:

1. A device for the production of wine comprising:
   a rigid outer container having a bottom and a sidewall,
   a hermetically sealed fermentation bag sized to fit side the rigid outer container configured to be filled with a liquid and having a relief valve coupled to an opening in the fermentation bag, and
   means for agitating and wetting a cap formed in the liquid in the fermentation bag by providing equal radially inward directed pressure to all sides of the fermentation bag so that the liquid is forced in a vertical direction through the cap,
   wherein the means for agitating comprises an inflation bladder having an upper and lower chamber separated by a horizontally extending seam,
   wherein the upper chamber has an inflation tube configured to be coupled to a pressurized air source and the lower chamber has a second inflation tube configured to be coupled to the pressurized air source.

2. The device of claim 1, wherein the inflation bladder is further configured as a ring-shaped bladder and inflation of the lower chamber is further configured to force carbon dioxide build-up in a headspace of the bag through the relief valve.

3. The device of claim 1, wherein the inflation bladder is configured to fully inflate the lower bladder and fully inflate the upper bladder to press the liquid out of the fermentation bag.

4. The device of claim 1, wherein the inflation tube is coupled to the pressurized air source via a solenoid valve and the second inflation tube is coupled to the pressurized air source via a second solenoid valve.

5. The device of claim 1, further comprising a perforated tube having perforations and configured to be coupled to the fermentation bag in an air-tight manner when the relief valve is removed from the fermentation bag.

6. The device of claim 1, wherein the upper chamber defines a single air space extending continuously forming a ring above the seam and the lower chamber defines another single air space extending continuously forming a ring below the seam.

* * * * *